United States Patent [19]
Klementowski

[11] Patent Number: 5,616,429
[45] Date of Patent: Apr. 1, 1997

[54] ALKALI METAL ELECTROCHEMICAL CELL EXHIBITING REDUCED VOLTAGE DELAY AND METHOD OF MANUFACTURE

[75] Inventor: Thomas W. Klementowski, Amherst, N.Y.

[73] Assignee: Wilson Greatbatch Ltd., Clarence, N.Y.

[21] Appl. No.: 448,987

[22] Filed: May 24, 1995

[51] Int. Cl.$^6$ .................. H01M 14/00; H01M 10/44; H01M 10/50; H01M 6/14
[52] U.S. Cl. .................. 429/3; 429/50; 429/62; 429/194; 429/197; 429/219; 429/220; 429/223; 429/224
[58] Field of Search ............... 429/3, 50, 62, 429/120, 137, 194, 197, 219, 113, 220, 223–224

[56] References Cited

U.S. PATENT DOCUMENTS

| | | | |
|---|---|---|---|
| 4,387,143 | 6/1983 | Arita et al. | 429/174 |
| 4,448,861 | 5/1984 | Fleischer et al. | 429/50 X |
| 4,547,440 | 10/1985 | Hooper et al. | 429/50 X |
| 4,608,753 | 9/1986 | Fleischer | 429/196 X |
| 5,506,068 | 4/1996 | Dan et al. | 429/50 |
| 5,516,340 | 5/1996 | Takeuchi et al. | 429/219 X |
| 5,545,497 | 8/1996 | Takeuchi et al. | 429/219 X |

*Primary Examiner*—Donald R. Valentine
*Attorney, Agent, or Firm*—Hodgson, Russ, Andrews, Woods & Goodyear LLP

[57] ABSTRACT

An alkali metal electrochemical cell capable of delivering high current pulses without exhibiting voltage delay, rapidly recovering its open circuit voltage and having high current capacity, is described. The stated benefits are realized by conditioning the cell heated at an elevated temperature for an extended period of time.

24 Claims, No Drawings

ALKALI METAL ELECTROCHEMICAL CELL EXHIBITING REDUCED VOLTAGE DELAY AND METHOD OF MANUFACTURE

BACKGROUND OF INVENTION

1. Field of the Invention

The present invention generally relates to an alkali metal electrochemical cell, and more particularly, to a lithium cell conditioned for current pulse discharge applications.

2. Description of the Prior Art

It is well known that the anode surface film, known as solid-electrolyte interphase (SEI), plays a very important role in the discharge performance of either a primary or a secondary alkali metal electrochemical cell, and in particular, a lithium cell. A good SEI benefits cell performance, including high discharge capacity, long useful life, better rechargeability for secondary cells and little or no voltage delay during current pulse applications. Since the formation of a surface film is unavoidable for alkali metal, and in particular, lithium metal anodes, and for lithium intercalated carbon anodes, due to their low potential and high reactivity towards organic electrolytes, much effort has been focused on modification of the chemical composition and morphology of the anode surface film.

The ideal anode surface film should be electrically insulating and ionically conducting. While most alkali metal, and in particular lithium electrochemical, systems meet the first requirement, the second requirement is difficult to achieve. As a result, impedance builds up inside the cell due to this surface layer formation which often results in reduced discharge voltage and reduced cell capacity. In the case of a cell subjected to current pulse discharge, voltage delay and voltage drop may occur as a result of the anode surface film and limit the effectiveness of the cell under these conditions, i.e., decrease the current pulse discharge capacity of the cell.

Among the known techniques for reducing voltage delay under current pulse discharge conditions are the inclusion of various voltage delay reducing additives in the electrolyte. U.S. Pat. No. 4,658,753 to Fleischer describes adding to the electrolyte a substance from the group of alkyl-2-cyanoacrylates and acrylic and substituted acrylic ester polymers for the purpose of minimization of voltage delay in lithium oxyhalide cells.

The present invention does not relate to modifying the electrochemical system by the inclusion of a voltage delay reducing additive into the electrolyte. Instead, the alkali metal cell is subjected to elevated temperature to heat condition the cell. After heat conditioning, the cell is dischargeable under current pulse applications with reduced or no appreciable voltage delay.

SUMMARY OF THE INVENTION

It is known that voltage delay is typically exhibited in an alkali metal/mixed metal oxide cell, such as a lithium/silver vanadium oxide cell, that has been depleted of approximately 40% to 70% of its capacity and is subjected to current pulse discharge applications. The present invention is directed to improvements in the pulse discharge performance of an alkali metal electrochemical cell, and more particularly, a primary lithium, solid cathode electrochemical cell, by subjecting the cell to elevated temperature to heat condition the cell. The thusly conditioned cell exhibits reduced and in some cases no voltage delay under current pulse discharge usage, which is an unexpected result. While the relevant mechanism is not fully understood at this time, it is believed that the extended thermal expose of an electrochemical cell according to the present invention provides the SEI with enhanced ionic conductivity, which benefits pulse discharge application. The concept of this invention is likewise applicable to secondary alkali metal electrochemical cells.

These and other aspects of the present invention will become more apparent to those skilled in the art by reference to the following description and to the appended drawings.

DETAILED DESCRIPTION OF THE PREFERRED EMBODIMENTS

The electrochemical cell according to the present invention includes an anode electrode selected from Group IA of the Periodic Table of Elements, including lithium, sodium, potassium, etc., and their alloys and intermetallic compounds including, for example Li-Si, Li-B and Li-Si-B alloys and intermetallic compounds. The preferred anode comprises lithium, and the more preferred anode comprises a lithium alloy, the preferred lithium alloy being lithium-aluminum with the aluminum comprising from between about 0% to about 50% by weight of the alloy. The greater the amount of aluminum present by weight in the alloy the lower the energy density of the cell.

The form of the anode may vary, but preferably the anode is a thin metal sheet or foil of the anode metal, pressed or rolled on a metallic anode current collector, i.e., preferably comprising nickel, to form an anode component. In the exemplary cell of the present invention, the anode component has an extended tab or lead of the same material as the anode current collector, i.e., preferably nickel, integrally formed therewith, such as by welding and contacted by a weld to a cell case of conductive metal in a case-negative electrical configuration. Alternatively, the anode may be formed in some other geometry, such as a bobbin shape, cylinder or pellet to allow an alternate low surface area cell design.

The cathode electrode may comprise a metal element, a metal oxide, a mixed metal oxide, a metal sulfide or carbonaceous compounds, and combinations thereof. Suitable cathode active materials include silver vanadium oxide (SVO), copper vanadium oxide, copper silver vanadium oxide (CSVO), manganese dioxide, titanium disulfide, copper oxide, copper sulfide, iron sulfide, iron disulfide, carbon and fluorinated carbon, and mixtures thereof. The solid cathode exhibits excellent thermal stability and is generally safer and less reactive than a non-solid cathode.

Preferably, the cathode active material comprises a mixed metal oxide formed by chemical addition, reaction or otherwise intimate contact or by a thermal spray coating process of various metal sulfides, metal oxides or metal oxide/elemental metal combinations. The materials thereby produced contain metals and oxides of Groups IB, IIB, IIIB, IVB, VB, VIB, VIIB and VIII of the Periodic Table of Elements, which includes the noble metals and/or their oxide compounds.

By way of illustration, and in no way intended to be limiting, an exemplary cathode active material comprises silver vanadium oxide having the general formula $Ag_xV_2O_y$, in any one of its many phases, i.e. β-phase silver vanadium oxide having in the general formula $x=0.35$ and $y=5.18$, γ-phase silver vanadium oxide having in the general formula $x=0.74$ and $y=5.37$ and ε-phase silver vanadium oxide having in the general formula $x=1.0$ and $y=5.5$, and combination and mixtures of phases thereof.

Such cathode active materials may be pressed into a cathode pellet with the aid of a suitable binder material such as a fluoro-resin powder, preferably polytetrafluoroethylene (PTFE) powder, and a material having electronic conduction characteristics such as graphite powder, acetylene black powder and carbon black powder. In some cases, no binder material or electronic conductor material is required to provide a similarly suitable cathode body. In some cases, the cathode active materials may also be prepared by rolling, spreading or pressing a mixture of the materials mentioned above onto a suitable current collector. Cathodes prepared as described above may be in the form of one or more plates operatively associated with at least one or more plates of anode material, or the cathode may be in the form of a strip wound with a corresponding strip of anode material in a structure similar to a "jellyroll".

The cell of the present invention includes a separator to provide physical separation between the anode and cathode active electrodes. The separator is of electrically insulative material to prevent an internal electrical short circuit between the electrodes, and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the cell. Illustrative separator materials include non-woven glass, polypropylene, polyethylene, glass fiber material, ceramics, polytetrafluoroethylene membrane commercially available under the designations ZITEX (Chemplast Inc.), polypropylene membrane, commercially available under the designation CELGARD (Celanese Plastic Company Inc.) and DEXIGLAS (C. H. Dexter, Div., Dexter Corp.)

The form of the separator typically is a sheet which is placed between the anode and cathode electrodes and in a manner preventing physical contact therebetween. Such is the case when the anode is folded in a serpentine-like structure with a plurality of cathode plates disposed intermediate the anode folds and received in a cell casing or when the electrode combination is rolled or otherwise formed into a cylindrical "jellyroll" configuration.

The electrochemical cell of the present invention further includes a nonaqueous, ionically conductive electrolyte which serves as a medium for migration of ions between the anode and the cathode during the electrochemical reactions of the cell. The electrochemical reaction at the cathode involves conversion of ions in atomic or molecular forms which migrate from the anode to the cathode. Thus, nonaqueous electrolytes suitable for the present invention are substantially inert to the anode and cathode materials, and they exhibit those physical properties necessary for ionic transport namely, low viscosity, low surface tension and wettability.

A suitable electrolyte has an inorganic, ionically conductive salt dissolved in a nonaqueous solvent, and more preferably, the electrolyte includes an ionizable alkali metal salt dissolved in a mixture of aprotic organic solvents comprising a low viscosity solvent and a high permittivity solvent. The inorganic, ionically conductive salt serves as the vehicle for migration of the anode ions to intercalate into the cathode active material, and has the general formula $MM'F_6$ wherein M is an alkali metal similar to the alkali metal comprising the anode and M' is an element selected from the group consisting of phosphorous, arsenic and antimony. Examples of salts yielding $M'F_6$ are: hexafluorophosphate ($PF_6$), hexafluoroarsenate ($AsF_6$) and hexafluoroantimonate ($SbF_6$). Alternatively, the corresponding sodium or potassium salts may be used.

Preferably the electrolyte comprises at least one ion-forming alkali metal salt of hexafluorophosphate, hexafluoroarsenate or hexafluoroantimonate dissolved in a suitable organic solvent wherein the ion-forming alkali metal is similar to the alkali metal comprising the anode. Thus, in the case of an anode comprising lithium, the alkali metal salt comprises lithium hexafluorophosphate, lithium hexafluoroarsenate or lithium hexafluoroantimonate dissolved in a suitable solvent mixture. Other inorganic salts useful with the present invention include $LiBF_4$, $LiClO_4$ and $LiCF_3SO_3$, and mixtures thereof. The cathode active material is preferably the transition mixed metal oxide $AgV_2O_{5.5}$ (SVO).

Low viscosity solvents include tetrahydrofuran (THF), methyl acetate (MA), diglyme, triglyme, tetraglyme, dimethyl carbonate (DMC), 1,2-dimethoxyethane (DME) and mixtures thereof, and high permittivity solvents include cyclic carbonates, cyclic esters and cyclic amides such as propylene carbonate (PC), ethylene carbonate (EC), acetonitrile, dimethyl sulfoxide, dimethyl formamide, dimethyl acetamide, γ-butyrolactone (GBL) and N-methyl-pyrrolidinone (NMP) and mixtures thereof. In the present invention, the anode is lithium metal and the preferred electrolyte is 1.0M to 1.4M $LiAsF_6$ dissolved in an aprotic solvent mixture comprising a 50/50 mixture (by volume) of propylene carbonate (PC) and dimethoxyethane (DME).

The assembly of the cell described herein is preferably in the form of a plurality of cathode plates, each pressed onto an expanded metal current collector and encapsulated in a separator envelope, and an anode in the form of a strip encapsulated in a separator envelope and wrapped accordion style around the cathode plates. This electrochemical system is inserted into a prismatic cell housing that may comprise materials such as stainless steel, mild steel, nickel-plated mild steel, titanium or aluminum, but not limited thereto, so long as the metallic material is compatible for use with components of the cell.

The cell header comprises a metallic lid with a first hole to accommodate a glass-to-metal seal/terminal pin feedthrough and a second hole for electrolyte filling. The glass used is of a corrosion resistant type having from between about 0% to about 50% by weight silicon such as CABAL 12, TA 23, FUSITE 425 or FUSITE 435. The positive terminal pin feedthrough preferably comprises titanium although molybdenum, aluminum, nickel alloy, or stainless steel can also be used. The cell header comprises elements having compatibility with the other components of the electrochemical cell and is resistant to corrosion. The cathode lead is welded to the positive terminal pin in the glass-to-metal seal and the header is welded to the case containing the electrode stack. The cell is thereafter filled with the electrolyte solution described hereinabove and hermetically sealed such as by close-welding a stainless steel ball over the fill hole, but not limited thereto. This above assembly describes a case-negative cell which is the preferred construction of the exemplary cell of the present invention. As is well known to those skilled in the art, the exemplary electrochemical system of the present invention can also be constructed in a case-positive configuration.

In accordance with the present invention, after assembly of the cell is completed, the cell is heated at an elevated temperature for a period of time so that the cell is dischargeable under current pulse applications without exhibiting voltage delay. According to a preferred mode of the present invention, which will be described in detail presently, the cell is heated at a temperature of at least about 75° C. for at least 14 days.

The following examples describe the manner and process of an electrochemical cell according to the present invention, and set forth the best mode contemplated by the inventors of carrying out the invention, but are not construed as limiting.

EXAMPLE I

Tests cells were constructed having a lithium anode and an electronically conductive cathode comprising silver vanadium oxide, along with an organic electrolyte. The cell design utilized a cathode in the form of a sheet consisting of a mixture of 94% of SVO cathode active material, by weight, along with 3% of a fluoro-resin powder such as polytetrafluoroethylene, 2% graphite, and 1% black carbon. The mixture was pressed onto an expanded metal current collector, and encapsulated in a polypropylene film laminate separator. The anode of each cell was a strip of metallic lithium, also encapsulated in a polypropylene film laminate separator. The anode was wrapped accordion style around the cathode plates. Both electrodes were inserted into a prismatic housing that was filled with a 1 molar solution of lithium hexafluoroarsenate ($LiAsF_6$) dissolved in an equal volume mixture of propylene carbonate (PC) and 1,2-dimethoxyethane (DME) as the electrolyte. The test cells were hermetically sealed.

To study the effects of various high temperature exposures on the performance of lithium/silver vanadium oxide (Li/SVO) cells, a test matrix of 132 cells, constructed as described above and consisting of eleven test groups with twelve cells per group, was built. Elevated temperature conditioning consisted of subjecting the various cells to temperatures of either 50° C., 65° C. or 80° C. (±5° C.) for either 7, 14 or 21 continuous days. An additional test was performed in which some cells were exposed for a total of 14 days to four cycles of 3.5 days at 65° C. and 3.5 days at room temperature. One group was designated a control group and did not undergo heat conditioning.

All cells were subjected to dimensional analysis and helium leak tests both prior to and immediately following their respective elevated temperature exposure. Prior to discharge, all cells were subjected to a standard burn-in, which consisted of a 2.49 KΩ load for 17 hours, followed by an open circuit "rest" period and a single pulse train of four, 2.0 amp pulses; 10 seconds on and 15 seconds open circuit per pulse at one week after elevated temperature conditioning. The discharge regimes used were either Accelerated Pulse Test (APT), 1 year ADD, 3 year ADD or 5 year ADD. Each group of 12 cells was divided into groups of three cells evenly distributed among the four discharge regimes. The test matrix of 132 cells is shown in Table 1.

TABLE 1

| | |
|---|---|
| Group A: | 7 days exposure at 50° C. |
| Group B: | 7 days exposure at 65° C. |
| Group C: | 7 days exposure at 80° C. |
| Group D: | 14 days exposure at 50° C. |
| Group E: | 14 days exposure at 65° C. |
| Group F: | 14 days exposure at 80° C. |
| Group G: | 21 days exposure at 50° C. |
| Group H: | 21 days exposure at 65° C. |
| Group I: | 21 days exposure at 80° C. |
| Group J: | 4 cycles of 3.5 days at 65° C., 3.5 days at room temperature |
| Group K: | Controls cells (No elevated temperature exposure) |

All cells passed helium leak tests both before and after thermal conditioning, and no significant dimensional changes were noted for any cell following thermal exposure. The Accelerated Pulse Test consisted of a pulse train of four, 2.0 amp pulses; 10 seconds on and 15 seconds open circuit per pulse every 30 minutes (no background load). The APT cell capacities are summarized in Table 2. Regression analysis was used to determine if either temperature or exposure time had a significant effect on cell capacity. Results of the regression analysis to 2.0, 1.7 and 1.5 volts indicated that temperature did have a statistically significant effect on capacity. On the other hand, the regression analysis results also indicated that exposure time did not have a significant effect on capacity.

TABLE 2

ACCELERATED PULSE TEST (APT) DISCHARGE RESULTS

| SERIAL NUMBER | TEST GROUP | EXPOSURE TIME (DAYS) | TEST TEMP (°C.) | CAPACITY (mahrs) @ 2.0V | @ 1.7V | @ 1.5V |
|---|---|---|---|---|---|---|
| 035172 | A | 7 | 50 | 1521 | 1749 | 1840 |
| 028876 | A | 7 | 50 | 1536 | 1758 | 1847 |
| 024789 | A | 7 | 50 | 1413 | 1649 | 1744 |
| 024438 | B | 7 | 65 | 1488 | 1694 | 1774 |
| 024439 | B | 7 | 65 | 1469 | 1683 | 1772 |
| 029222 | B | 7 | 65 | 1533 | 1742 | 1828 |
| 029294 | C | 7 | 80 | 1513 | 1708 | 1787 |
| 029790 | C | 7 | 80 | 1536 | 1737 | 1822 |
| 028879 | C | 7 | 80 | 1528 | 1729 | 1824 |
| 035181 | D | 14 | 50 | 1540 | 1746 | 1832 |
| 028930 | D | 14 | 50 | 1516 | 1734 | 1823 |
| 034466 | D | 14 | 50 | 1513 | 1736 | 1813 |
| 024431 | E | 14 | 65 | 1502 | 1687 | 1768 |
| 036433 | E | 14 | 65 | 1488 | 1659 | 1728 |
| 024861 | E | 14 | 65 | 1498 | 1675 | 1739 |
| 035226 | F | 14 | 80 | 1491 | 1702 | 1789 |
| 025029 | F | 14 | 80 | 1494 | 1687 | 1764 |
| 035161 | F | 14 | 80 | 1507 | 1700 | 1788 |
| 024405 | G | 21 | 50 | 1462 | 1674 | 1757 |
| 030781 | G | 21 | 50 | 1481 | 1709 | 1796 |
| 024272 | G | 21 | 50 | 1484 | 1697 | 1785 |
| 024270 | H | 21 | 65 | 1498 | 1694 | 1778 |
| 035099 | H | 21 | 65 | 1550 | 1760 | 1837 |
| 035174 | H | 21 | 65 | 1565 | 1767 | 1849 |

TABLE 2-continued

ACCELERATED PULSE TEST (APT) DISCHARGE RESULTS

| SERIAL NUMBER | TEST GROUP | EXPOSURE TIME (DAYS) | TEST TEMP (°C.) | CAPACITY (mahrs) @ 2.0V | @ 1.7V | @ 1.5V |
|---|---|---|---|---|---|---|
| 024265 | I | 21 | 80 | 1474 | 1669 | 1760 |
| 024280 | I | 21 | 80 | 1468 | 1651 | 1737 |
| 035197 | I | 21 | 80 | 1491 | 1719 | 1809 |
| 028864 | J | 3.5 on/3.5 off | 65 | 1525 | 1740 | 1832 |
| 024303 | J | 3.5 on/3.5 off | 65 | 1499 | 1702 | 1795 |
| 035223 | J | 3.5 on/3.5 off | 65 | 1500 | 1730 | 1815 |
| 035247 | K | N/A | room temp | 1643 | 1838 | 1892 |
| 028886 | K | N/A | room temp | 1552 | 1761 | 1845 |
| 028925 | K | N/A | room temp | 1538 | 1732 | 1812 |

Continuous Versus Cyclic Exposure:

Cell groups E and J were both exposed to 65° C. for a total of 14 days. However, group E was exposed for 14 continuous days while group J was exposed in 4 cycles of 3.5 days each (with a 3.5 day "rest" between cycles). A Student's t-test was performed on the capacity data for groups E and J to determine if continuous versus cyclic thermal exposure resulted in significantly different cell capacities. Results of these t-tests on APT capacities to 2.0, 1.7 and 1.5 volts indicated that the average capacities of the continuously exposed cells was typically 1% to 4% lower than that of the cyclically exposed cells. While this difference is deemed statistically significant, the resulting difference in capacity is not considered meaningful. Thus, no meaningful effects on APT cell capacity were seen over the range of storage temperatures and times tested and no meaningful difference was seen in the capacities of cyclically exposed versus continuously exposed cells.

Destructive Analysis:

All thirty-three cells which completed APT discharge were destructively analyzed. The range of exposure temperatures and durations tested resulted in no internal cell anomalies. No adverse effects were seen on the cell internal components over the range of storage temperatures and times tested.

EXAMPLE II

Analysis of 1 Year ADD Cell Performance:

One year ADD consisted of a 17.4 KΩ background load and a pulse train of four, 2.0 amp pulses; 10 seconds on and 15 seconds open circuit per pulse, six times a year. An analysis of variance (anova) was performed on the cell discharge data at the 6, 8, 10 and 12 month pulse trains. The results are shown in Tables 3, 4, 5 and 6, respectively. The particular pulse train voltages shown are the last voltage recorded during the first pulse of the train (P1 Last), the minimum voltage recorded during the first pulse of the pulse train (P1 Min.), the minimum voltage recorded during the fourth pulse of the pulse train (P4 Min.) and the voltage delay. Voltage delay occurs when the pulse minimum voltage is less than the last pulse voltage. An anova was also performed on the end-of-life capacity at P4 Min. =1500 my. The results are shown in Table 7 including the maximum beginning-of-life thickness of the cell case (max. BOL thickness) and maximum end-of-life thickness of the cell case (max. EOL thickness). The average of the selected data is also shown in the various tables. A 95% confidence level was chosen for all statistical analyses.

Six Month Pulse Train:

A summary of the six month discharge data for those cells subjected to the 1 year ADD is found in Table 3. No statistically significant difference was noted between the performance of the thermally exposed cells (groups A to J) and the control cells (group K) for the P1 last, P1 min., P4 min. and voltage delay readings.

Eight Month Pulse Train

A summary of the eight month discharge data for those cells subjected to the 1 year ADD is found in Table 4. No statistically significant difference was noted between the performance of the thermally exposured cells (groups A to J) and the control cells (group K) for the P1 Last, P1 Min., P4 Min. and voltage delay readings.

Ten Month Pulse Train:

A summary of the ten month discharge data for those cells subjected to the 1 year ADD is found in Table 5.

P1 Last.: Cell groups C (80° C., 7 days), F (80° C., 14 days), H(65° C., 21 days), I (80° C., 21 days) and J (65° C., cycled) indicated statistically significant differences in their P1 Last readings when compared to the control group. The average P1 Last voltage for groups C, F, H, I and J ranged from 10 to 11 percent (186 to 209 mv) higher than the average P1 Last voltage of the control group. In general, the P1 Last voltage tended to increase with increased exposure temperature. Exposure time had no significant effect on P1 Last voltage.

P1 Min.: Cell groups C (80° C., 7 days), F (80° C., 14 days), H (65° C., 21 days), I (80° C, 21 days) and J (65° C., cycled) showed statistically significant differences in their P1 Min. readings when compared to the control group. The average P1 Min. voltage for groups C, F, H, I and J ranged from 22 to 25 percent (380 to 419 mv) higher than the average P1 Min. voltage of the control group. In general, the P1 Min. voltage tended to increase with increasing exposure temperature. Exposure time had no significant effect on P1 Min. voltage.

P4 Min.: Cell groups C (80° C., 7 days), F (80° C., 14 days), H (65° C., 21 days) and J (65° C., cycled) showed statistically significant differences in their P4 Min. readings compared to the control group. The average P4 Min. voltage for groups C, F, H and J ranged from 7 to 9 percent (141 to 173 mv) higher than the average P4 Min. voltage of the control group. In general, the P4 Min. voltage tended to increase with increasing exposure temperature. Exposure time had no significant effect on P4 Min. voltage.

Voltage Delay: Cell groups C (80° C., 7 days), F (80° C., 14 days), H (65° C., 21 days), I (80° C., 21 days) and J (65° C., cycled) showed statistically significant differences in their voltage delay readings when compared to the control cells (Group K). As previously mentioned, an alkali metal/ mixed metal oxide cell such as a lithium/silver vanadium oxide cell that has been depleted of approximately 40% to 70% of its capacity typically exhibits voltage delay when subjected to current pulse discharge conditions. Thus, the lack of significant voltage delay in the thermally conditioned cells, i.e., cell groups C, F, H, I and J, is an unexpected result of the thermal conditioning of the present invention.

Twelve Month Pulse Train:

A summary of the twelve month discharge data for those cells subjected to 1 year ADD is found in Table 6.

P1 Last: No statistically significant difference was noted between the performance of the thermally exposed cells (groups A to J) and the control cells (group K).

P1 Min.: Only cell group I (80° C., 21 days) showed statistically significant difference when compared to the control group. Group I exhibited a mean P1 Min voltage which was 302 mv (18%) higher than that of the control group.

P4 Min.: No statistically significant difference was noted between the performance of the thermal exposure cells (groups A to J) and the control cells (group K). Voltage Delay: No significant voltage delay was evident for cell group F (80° C., 14 days) and I (80° C., 21 days). However, voltage delay for groups C (80° C., 7 days), H (65° C., 21 days) and J (65° C., cycled) was evident at the 12 month pulse train. Again, the absence of voltage delay in cell group F and I is an unobvious result of the thermal conditioning of the present invention.

No statistically significant difference was noted between the discharge performance of the thermally exposed cells (groups A to J) and the control cells (group K).

End-of-Life Capacity:

A summary of the end-of-life capacity data is found in Table 9 with no statistically significant difference between the end-of-life capacity of the thermally exposed cells (groups A to J) and the control cells (group K) at a 95% confidence level.

Continuous Versus Cyclic Exposure:

Cell groups E and J were both exposed to 65° C. for a total of 14 days. However, group E was exposed for 14 continuous days while group J was exposed in 4 cycles of 3.5 days each (with a 3.5 day "rest" between cycles). No statistically significant difference was noted between the discharge performance of groups E and J at a 95% confidence level.

Dimensional Characteristics:

Maximum thickness measurements for each cell are shown in Table 7. No statistically significant dimensional changes were noted for any cell following thermal exposure. Following 1 year ADD discharge, the total swelling (max. EOL thickness—max. BOL thickness) ranged from 0.013 to 0.056 inches, with an average of 0.037 inches. No trend based on exposure temperature or exposure time was evident.

TABLE 3

1 YEAR ADD DISCHARGE RESULTS (6 MONTH PULSE TRAIN)

| SERIAL NUMBER | TEST GROUP | TEMP (°C.) | TIME (DAYS) | P1 LAST (mv) | (avg.) | P1 MIN. (mv) | (avg.) | P4 MIN. (mv) | (avg.) | VOLTAGE DELAY (mv) | (avg.) |
|---|---|---|---|---|---|---|---|---|---|---|---|
| 020685 | A | 50 | 7 | 2258 | 2275 | 2244 | 2251 | 2239 | 2258 | 14 | 24 |
| 035173 |   | 50 | 7 | 2272 |      | 2214 |      | 2258 |      | 58 |    |
| 028901 |   | 50 | 7 | 2296 |      | 2296 |      | 2278 |      | 0  |    |
| 035186 | B | 65 | 7 | 2282 | 2275 | 2230 | 2204 | 2264 | 2260 | 52 | 72 |
| 024592 |   | 65 | 7 | 2263 |      | 2173 |      | 2247 |      | 90 |    |
| 035170 |   | 65 | 7 | 2281 |      | 2208 |      | 2268 |      | 73 |    |
| 024892 | C | 80 | 7 | 2259 | 2269 | 2110 | 2149 | 2245 | 2253 | 149 | 120 |
| 035220 |   | 80 | 7 | 2278 |      | 2163 |      | 2261 |      | 115 |    |
| 023491 |   | 80 | 7 | 2271 |      | 2175 |      | 2252 |      | 96  |    |
| 023532 | D | 50 | 14 | 2266 | 2265 | 2236 | 2216 | 2246 | 2247 | 30 | 49 |
| 020675 |   | 50 | 14 | 2269 |      | 2250 |      | 2253 |      | 19 |    |
| 024876 |   | 50 | 14 | 2259 |      | 2162 |      | 2243 |      | 97 |    |
| 035177 | E | 65 | 14 | 2281 | 2280 | 2205 | 2209 | 2269 | 2264 | 76 | 71 |
| 035199 |   | 65 | 14 | 2288 |      | 2225 |      | 2271 |      | 63 |    |
| 020668 |   | 65 | 14 | 2272 |      | 2197 |      | 2252 |      | 75 |    |
| 023599 | F | 80 | 14 | 2293 | 2286 | 2293 | 2286 | 2265 | 2266 | 0 | 0 |
| 035166 |   | 80 | 14 | 2280 |      | 2280 |      | 2262 |      | 0 |    |
| 031135 |   | 80 | 14 | 2286 |      | 2285 |      | 2272 |      | 1 |    |
| 035182 | G | 50 | 21 | 2279 | 2280 | 2208 | 2220 | 2268 | 2268 | 71 | 61 |
| 035198 |   | 50 | 21 | 2275 |      | 2230 |      | 2263 |      | 45 |    |
| 035178 |   | 50 | 21 | 2287 |      | 2221 |      | 2272 |      | 66 |    |
| 029351 | H | 65 | 21 | 2275 | 2299 | 2187 | 2239 | 2263 | 2279 | 88 | 60 |
| 030779 |   | 65 | 21 | 2283 |      | 2191 |      | 2272 |      | 92 |    |
| 035356 |   | 65 | 21 | 2338 |      | 2338 |      | 2301 |      | 0  |    |
| 028867 | I | 80 | 21 | 2284 | 2265 | 2284 | 2265 | 2250 | 2238 | 0 | 0 |
| 020692 |   | 80 | 21 | 2254 |      | 2254 |      | 2232 |      | 0 |    |
| 024830 |   | 80 | 21 | 2257 |      | 2257 |      | 2232 |      | 0 |    |
| 024264 | J | 65 | cycled | 2292 | 2302 | 2292 | 2302 | 2273 | 2279 | 0 | 0 |
| 024335 |   | 65 | cycled | 2313 |      | 2313 |      | 2285 |      | 0 |    |
| 024308 |   | 65 | cycled | 2301 |      | 2300 |      | 2279 |      | 1 |    |
| 035175 | K | control | control | 2274 | 2275 | 2209 | 2238 | 2259 | 2261 | 65 | 37 |
| 035206 |   | control | control | 2283 |      | 2245 |      | 2268 |      | 38 |    |
| 024378 |   | control | control | 2268 |      | 2260 |      | 2255 |      | 8 |    |

TABLE 4

1 YEAR ADD DISCHARGE RESULTS (8 MONTH PULSE TRAIN)

| SERIAL NUMBER | TEST GROUP | TEMP (°C.) | TIME (DAYS) | P1 LAST (mv) | (avg.) | P1 MIN. (mv) | (avg.) | P4 MIN. (mv) | (avg.) | VOLTAGE DELAY (mv) | (avg.) |
|---|---|---|---|---|---|---|---|---|---|---|---|
| 020685 | A | 50 | 7 | 2155 | 2150 | 2114 | 2090 | 2169 | 2179 | 41 | 61 |
| 035173 |   | 50 | 7 | 2118 |   | 2075 |   | 2171 |   | 43 |   |
| 028901 |   | 50 | 7 | 2178 |   | 2080 |   | 2197 |   | 98 |   |
| 035186 | B | 65 | 7 | 2153 | 2146 | 2147 | 2140 | 2184 | 2180 | 6 | 6 |
| 024592 |   | 65 | 7 | 2139 |   | 2138 |   | 2170 |   | 1 |   |
| 035170 |   | 65 | 7 | 2146 |   | 2136 |   | 2186 |   | 10 |   |
| 024892 | C | 80 | 7 | 2144 | 2162 | 2130 | 2131 | 2172 | 2182 | 14 | 30 |
| 035220 |   | 80 | 7 | 2164 |   | 2147 |   | 2189 |   | 17 |   |
| 023491 |   | 80 | 7 | 2177 |   | 2117 |   | 2186 |   | 60 |   |
| 023532 | D | 50 | 14 | 2153 | 2147 | 2118 | 2101 | 2172 | 2171 | 35 | 46 |
| 020675 |   | 50 | 14 | 2170 |   | 2125 |   | 2183 |   | 45 |   |
| 024876 |   | 50 | 14 | 2117 |   | 2059 |   | 2158 |   | 58 |   |
| 035177 | E | 65 | 14 | 2133 | 2160 | 2116 | 2135 | 2162 | 2181 | 17 | 25 |
| 035199 |   | 65 | 14 | 2166 |   | 2165 |   | 2193 |   | 1 |   |
| 020668 |   | 65 | 14 | 2180 |   | 2123 |   | 2187 |   | 57 |   |
| 023599 | F | 80 | 14 | 2206 | 2196 | 2125 | 2129 | 2200 | 2197 | 81 | 67 |
| 035166 |   | 80 | 14 | 2188 |   | 2135 |   | 2192 |   | 53 |   |
| 031135 |   | 80 | 14 | 2194 |   | 2126 |   | 2199 |   | 68 |   |
| 035182 | G | 50 | 21 | 2140 | 2140 | 2110 | 2115 | 2187 | 2185 | 30 | 26 |
| 035198 |   | 50 | 21 | 2135 |   | 2111 |   | 2179 |   | 24 |   |
| 035178 |   | 50 | 21 | 2146 |   | 2123 |   | 2190 |   | 23 |   |
| 029351 | H | 65 | 21 | 2167 | 2186 | 2128 | 2119 | 2192 | 2204 | 39 | 67 |
| 030779 |   | 65 | 21 | 2178 |   | 2116 |   | 2201 |   | 62 |   |
| 035356 |   | 65 | 21 | 2214 |   | 2114 |   | 2220 |   | 100 |   |
| 028867 | I | 80 | 21 | 2181 | 2174 | 2129 | 2125 | 2177 | 2169 | 52 | 49 |
| 020692 |   | 80 | 21 | 2169 |   | 2121 |   | 2164 |   | 48 |   |
| 024830 |   | 80 | 21 | 2171 |   | 2124 |   | 2166 |   | 47 |   |
| 024264 | J | 65 | cycled | 2196 | 2201 | 2133 | 2129 | 2209 | 2213 | 63 | 72 |
| 024335 |   | 65 | cycled | 2211 |   | 2112 |   | 2219 |   | 99 |   |
| 024308 |   | 65 | cycled | 2197 |   | 2142 |   | 2212 |   | 55 |   |
| 035175 | K | control | control | 2104 | 2127 | 2012 | 2061 | 2160 | 2172 | 92 | 66 |
| 035206 |   | control | control | 2124 |   | 2059 |   | 2174 |   | 65 |   |
| 024378 |   | control | control | 2153 |   | 2113 |   | 2181 |   | 40 |   |

TABLE 5

1 YEAR ADD DISCHARGE RESULTS (10 MONTH PULSE TRAIN)

| SERIAL NUMBER | TEST GROUP | TEMP (°C.) | TIME (DAYS) | P1 LAST (mv) | (avg.) | P1 MIN. (mv) | (avg.) | P4 MIN. (mv) | (avg.) | VOLTAGE DELAY (mv) | (avg.) |
|---|---|---|---|---|---|---|---|---|---|---|---|
| 020685 | A | 50 | 7 | 2009 | 1968 | 1817 | 1750 | 2013 | 2000 | 192 | 218 |
| 035173 |   | 50 | 7 | 1892 |   | 1676 |   | 1949 |   | 216 |   |
| 028901 |   | 50 | 7 | 2003 |   | 1758 |   | 2037 |   | 245 |   |
| 035186 | B | 65 | 7 | 2017 | 2025 | 1829 | 1844 | 2046 | 2052 | 188 | 182 |
| 024592 |   | 65 | 7 | 2061 |   | 1932 |   | 2075 |   | 129 |   |
| 035170 |   | 65 | 7 | 1998 |   | 1770 |   | 2036 |   | 228 |   |
| 024892 | C | 80 | 7 | 2100 | 2111* | 2099 | 2105* | 2096 | 2109* | 1 | 6* |
| 035220 |   | 80 | 7 | 2104 |   | 2087 |   | 2111 |   | 17 |   |
| 023491 |   | 80 | 7 | 2129 |   | 2129 |   | 2119 |   | 0 |   |
| 023532 | D | 50 | 14 | 2021 | 2002 | 1837 | 1798 | 2028 | 2018 | 184 | 204 |
| 020675 |   | 50 | 14 | 2043 |   | 1891 |   | 2051 |   | 152 |   |
| 024876 |   | 50 | 14 | 1942 |   | 1666 |   | 1974 |   | 276 |   |
| 035177 | E | 65 | 14 | 1946 | 2041 | 1722 | 1930 | 1967 | 2053 | 224 | 111 |
| 035199 |   | 65 | 14 | 2063 |   | 1967 |   | 2085 |   | 96 |   |
| 020668 |   | 65 | 14 | 2114 |   | 2102 |   | 2108 |   | 12 |   |
| 023599 | F | 80 | 14 | 2136 | 2121* | 2136 | 2121* | 2131 | 2121* | 0 | 0* |
| 035166 |   | 80 | 14 | 2112 |   | 2112 |   | 2115 |   | 0 |   |
| 031135 |   | 80 | 14 | 2115 |   | 2115 |   | 2118 |   | 0 |   |
| 035182 | G | 50 | 21 | 1947 | 1948 | 1704 | 1701 | 1999 | 1997 | 243 | 247 |
| 035198 |   | 50 | 21 | 1940 |   | 1687 |   | 1986 |   | 253 |   |
| 035178 |   | 50 | 21 | 1957 |   | 1711 |   | 2005 |   | 246 |   |
| 029351 | H | 65 | 21 | 2104 | 2107* | 2087 | 2087* | 2114 | 2120* | 17 | 20* |
| 030779 |   | 65 | 21 | 2090 |   | 2048 |   | 2106 |   | 42 |   |
| 035356 |   | 65 | 21 | 2127 |   | 2127 |   | 2140 |   | 0 |   |
| 028867 | I | 80 | 21 | 2108 | 2111* | 2108 | 2111* | 2098 | 2097 | 0 | 0* |
| 020692 |   | 80 | 21 | 2112 |   | 2112 |   | 2097 |   | 0 |   |
| 024830 |   | 80 | 21 | 2112 |   | 2112 |   | 2095 |   | 0 |   |
| 024264 | J | 65 | cycled | 2122 | 2130* | 2112 | 2126* | 2135 | 2141* | 10 | 4* |
| 024335 |   | 65 | cycled | 2131 |   | 2130 |   | 2145 |   | 1 |   |

TABLE 5-continued

1 YEAR ADD DISCHARGE RESULTS (10 MONTH PULSE TRAIN)

| SERIAL NUMBER | TEST GROUP | TEMP (°C.) | TIME (DAYS) | P1 LAST (mv) | (avg.) | P1 MIN. (mv) | (avg.) | P4 MIN. (mv) | (avg.) | VOLTAGE DELAY (mv) | (avg.) |
|---|---|---|---|---|---|---|---|---|---|---|---|
| 024308 |   | 65 | cycled | 2137 |   | 2135 |   | 2142 |   | 2 |   |
| 035175 | K | control | control | 1863 | 1921 | 1664 | 1707 | 1929 | 1968 | 199 | 214 |
| 035206 |   | control | control | 1890 |   | 1700 |   | 1944 |   | 190 |   |
| 024378 |   | control | control | 2009 |   | 1757 |   | 2032 |   | 252 |   |

*Indicates statistically significant difference (compared to control group @ 95% confidence level)

TABLE 6

1 YEAR ADD DISCHARGE RESULTS (12 MONTH PULSE TRAIN)

| SERIAL NUMBER | TEST GROUP | TEMP (°C.) | TIME (DAYS) | P1 LAST (mv) | (avg.) | P1 MIN. (mv) | (avg.) | P4 MIN. (mv) | (avg.) | VOLTAGE DELAY (mv) | (avg.) |
|---|---|---|---|---|---|---|---|---|---|---|---|
| 020685 | A | 50 | 7 | 1841 | 1851 | 1726 | 1719 | 1822 | 1844 | 115 | 132 |
| 035173 |   | 50 | 7 | 1828 |   | 1698 |   | 1826 |   | 130 |   |
| 028901 |   | 50 | 7 | 1885 |   | 1734 |   | 1883 |   | 151 |   |
| 035186 | B | 65 | 7 | 1850 | 1858 | 1628 | 1642 | 1863 | 1870 | 222 | 216 |
| 024592 |   | 65 | 7 | 1884 |   | 1668 |   | 1889 |   | 216 |   |
| 035170 |   | 65 | 7 | 1841 |   | 1631 |   | 1858 |   | 210 |   |
| 024892 | C | 80 | 7 | 1874 | 1921 | 1627 | 1735 | 1855 | 1904 | 247 | 186 |
| 035220 |   | 80 | 7 | 1898 |   | 1658 |   | 1899 |   | 240 |   |
| 023491 |   | 80 | 7 | 1992 |   | 1921 |   | 1958 |   | 71 |   |
| 023532 | D | 50 | 14 | 1884 | 1860 | 1750 | 1718 | 1874 | 1847 | 134 | 142 |
| 020675 |   | 50 | 14 | 1868 |   | 1728 |   | 1859 |   | 140 |   |
| 024876 |   | 50 | 14 | 1827 |   | 1676 |   | 1808 |   | 151 |   |
| 035177 | E | 65 | 14 | 1754 | 1851 | 1621 | 1686 | 1719 | 1833 | 133 | 165 |
| 035199 |   | 65 | 14 | 1862 |   | 1672 |   | 1878 |   | 190 |   |
| 020668 |   | 65 | 14 | 1937 |   | 1764 |   | 1902 |   | 173 |   |
| 023599 | F | 80 | 14 | 2051 | 1999 | 2051 | 1962 | 2024 | 1978 | 0 | 37 |
| 035166 |   | 80 | 14 | 1963 |   | 1893 |   | 1951 |   | 70 |   |
| 031135 |   | 80 | 14 | 1982 |   | 1941 |   | 1960 |   | 41 |   |
| 035182 | G | 50 | 21 | 1842 | 1844 | 1658 | 1672 | 1859 | 1857 | 184 | 171 |
| 035198 |   | 50 | 21 | 1841 |   | 1670 |   | 1851 |   | 171 |   |
| 035178 |   | 50 | 21 | 1848 |   | 1689 |   | 1862 |   | 159 |   |
| 029351 | H | 65 | 21 | 1929 | 1933 | 1720 | 1735 | 1919 | 1928 | 209 | 198 |
| 030779 |   | 65 | 21 | 1903 |   | 1657 |   | 1898 |   | 246 |   |
| 035356 |   | 65 | 21 | 1966 |   | 1828 |   | 1968 |   | 138 |   |
| 028867 | I | 80 | 21 | 2024 | 2019 | 2024 | 2019* | 1977 | 1975 | 0 | 0 |
| 020692 |   | 80 | 21 | 2016 |   | 2016 |   | 1972 |   | 0 |   |
| 024830 |   | 80 | 21 | 2018 |   | 2018 |   | 1975 |   | 0 |   |
| 024264 | J | 65 | cycled | 1984 | 1991 | 1762 | 1772 | 1983 | 1988 | 222 | 219 |
| 024335 |   | 65 | cycled | 1994 |   | 1779 |   | 1996 |   | 215 |   |
| 024308 |   | 65 | cycled | 1994 |   | 1774 |   | 1986 |   | 220 |   |
| 035175 | K | control | control | 1818 | 1858 | 1695 | 1717 | 1826 | 1863 | 123 | 141 |
| 035206 |   | control | control | 1845 |   | 1704 |   | 1853 |   | 141 |   |
| 024378 |   | control | control | 1912 |   | 1752 |   | 1909 |   | 160 |   |

*Indicates statistically significant difference (compared to control group @ 95% confidence level)

TABLE 7

1 YEAR ADD END-OF-LIFE CAPACITY & THICKNESS

| SERIAL NUMBER | TEST GROUP | TEMP (°C.) | TIME (DAYS) | CAPACITY @ p4MIN = 1500 mv (mAhr) | (group avg.) | MAX. BOL THICKNESS (Inches) | (group avg.) | MAX. EOL THICKNESS (Inches) | (group avg.) |
|---|---|---|---|---|---|---|---|---|---|
| 020685 | A | 50 | 7 | 1732 | 1765 | 0.348 | 0.350 | 0.385 | 0.384 |
| 035173 |   | 50 | 7 | 1765 |   | 0.346 |   | 0.388 |   |
| 028901 |   | 50 | 7 | 1797 |   | 0.357 |   | 0.380 |   |
| 035186 | B | 65 | 7 | 1845 | 1814 | 0.349 | 0.349 | 0.388 | 0.390 |
| 024592 |   | 65 | 7 | 1779 |   | 0.347 |   | 0.391 |   |
| 035170 |   | 65 | 7 | 1818 |   | 0.351 |   | 0.392 |   |
| 024892 | C | 80 | 7 | 1734 | 1771 | 0.349 | 0.349 | 0.390 | 0.386 |
| 035220 |   | 80 | 7 | 1814 |   | 0.348 |   | 0.388 |   |
| 023491 |   | 80 | 7 | 1765 |   | 0.349 |   | 0.381 |   |
| 023532 | D | 50 | 14 | 1767 | 1752 | 0.350 | 0.349 | 0.389 | 0.386 |
| 020675 |   | 50 | 14 | 1756 |   | 0.349 |   | 0.376 |   |
| 024876 |   | 50 | 14 | 1733 |   | 0.348 |   | 0.394 |   |
| 035177 | E | 65 | 14 | 1683 | 1750 | 0.351 | 0.350 | 0.407 | 0.392 |

TABLE 7-continued

| | | | | 1 YEAR ADD END-OF-LIFE CAPACITY & THICKNESS | | | | | |
|---|---|---|---|---|---|---|---|---|---|
| SERIAL | TEST | TEMP | TIME | CAPACITY @ p4MIN = 1500 mv | | MAX. BOL THICKNESS | | MAX. EOL THICKNESS | |
| NUMBER | GROUP | (°C.) | (DAYS) | (mAhr) | (group avg.) | (Inches) | (group avg.) | (Inches) | (group avg.) |
| 035199 | | 65 | 14 | 1817 | | 0.350 | | 0.389 | |
| 020668 | | 65 | 14 | 1750 | | 0.348 | | 0.380 | |
| 023599 | F | 80 | 14 | 1785 | 1793 | 0.349 | 0.349 | 0.378 | 0.379 |
| 035166 | | 80 | 14 | 1833 | | 0.347 | | 0.380 | |
| 031135 | | 80 | 14 | 1761 | | 0.350 | | 0.378 | |
| 035182 | G | 50 | 21 | 1828 | 1810 | 0.346 | 0.345 | 0.396 | 0.390 |
| 035198 | | 50 | 21 | 1787 | | 0.345 | | 0.385 | |
| 035178 | | 50 | 21 | 1816 | | 0.345 | | 0.388 | |
| 029351 | H | 65 | 21 | 1782 | 1811 | 0.354 | 0.353 | 0.399 | 0.388 |
| 030779 | | 65 | 21 | 1788 | | 0.349 | | 0.395 | |
| 035356 | | 65 | 21 | 1862 | | 0.357 | | 0.370 | |
| 028867 | I | 80 | 21 | 1759 | 1735 | 0.350 | 0.348 | 0.378 | 0.375 |
| 020692 | | 80 | 21 | 1716 | | 0.348 | | 0.376 | |
| 024830 | | 80 | 21 | 1731 | | 0.346 | | 0.370 | |
| 024264 | J | 65 | cycled | 1834 | 1825 | 0.347 | 0.346 | N/A | N/A |
| 024335 | | 65 | cycled | 1823 | | 0.346 | | N/A | |
| 024308 | | 65 | cycled | 1818 | | 0.346 | | N/A | |
| 035175 | K | control | control | 1764 | 1798 | 0.347 | 0.347 | 0.392 | 0.385 |
| 035206 | | control | control | 1809 | | 0.347 | | 0.387 | |
| 024378 | | control | control | 1821 | | 0.347 | | 0.377 | |

Summary:

No statistically significant differences were noted between the discharge performance of the elevated temperature cells and the control cells at either the 6 or 8 month pulse trains.

At the 10 month pulse train, cell groups C (80° C., 7 day), F (80° C., 14 day), H (65° C., 21 day), I (80° C., 21 day) and J (65° C., cycled) showed statistically significant differences in terms of their pulse voltage when compared to the control cells (group K). All of these thermally exposed cell groups exhibited higher voltages than the control group. In general, the cell performance (at 10 months) tended to improve with increasing exposure temperature. Exposure time had no significant effect on cell performance. Thus, no meaningful differences were noted between the performance of the elevated temperature cells and the control cells at the 12 month pulse train.

End-of-Life Capacity:

There was no statistically significant difference between the end-of-life capacity of the thermally exposed cell (Groups A-J) and the control cells (Group K) at a 95% confidence level.

Dimensional Characteristics:

Total call swelling (max. EOL thickness—max. BOL thickness) ranged from 0.013 to 0.056 inches, with an average of 0.037 inches. No trend based on exposure temperature or exposure time was evident.

Voltage Delay:

The control cells, (Group K), 50° C. exposure cells (groups A, D and G), 65° C. exposure cells (groups B, E and H) and the 80° C., 7 days exposure cells (group C) displayed reasonably typical voltage delay (>100 mv) at either the ten or twelve month pulse train (or in some cases at both the ten and twelve month pulse trains.) Group F (80° C., 14 days exposure) cells, while exhibiting larger than expected voltage delay at the first pulse train (269 to 394 mv), exhibited no statistically significant voltage delay throughout their remaining life. Group I (80° C., 21 day exposure) cells exhibited no statistically significant voltage delay at any time during discharge.

At this time, the three year ADD and five year ADD tests have not been completed.

It is appreciated that various modifications to the inventive concepts described herein may be apparent to those of ordinary skill in the art without departing from the spirit and scope of the present invention as defined by the appended claims.

What is claimed is:

1. A pulse dischargeable electrochemical cell comprising anode and cathode electrodes and an activating electrolyte, the improvement comprising: the cell characterized as having an ionically conductive solid-electrolyte interphase provided at the interface of the electrodes and the electrolyte as a result of the cell having been exposed to an elevated temperature of at least about 75° C. for an extended period of time longer than 7 days prior to pulse discharge so that the cell is pulse dischargeable under current pulse applications at a high pulse rate without exhibiting voltage delay.

2. The electrochemical cell of claim 1 wherein the ionically conductive solid-electrolyte interphase is characterized by the cell having been exposed to the elevated temperature for the extended period of time of at least about 14 days.

3. The electrochemical cell of claim 1 wherein the anode is of an alkali metal, the electrolyte is a nonaqueous electrolyte and there is dissolved therein an alkali metal salt similar to the alkali metal comprising the anode.

4. The electrochemical of claim 1 wherein the cathode is a mixed metal oxide.

5. An electrochemical cell dischargeable under current pulse applications, which comprises:

a) a casing;

b) an anode disposed inside the casing and comprising an alkali metal which is electrochemically oxidized to form metal ions upon discharge to generate electron flow in an external electrical circuit connected thereto;

c) a cathode in electrical association with the anode inside the casing, the cathode comprising a cathode active material, wherein the electron flow is generated by intercalation of the metal ions formed by oxidation of the alkali metal anode into the cathode active material;

d) a nonaqueous electrolyte provided in the casing to activate the anode and the cathode, the electrolyte comprising an alkali metal salt dissolved therein, wherein the alkali metal salt is similar to the alkali metal comprising the anode; and e) an ionically conductive solid-electrolyte interphase provided at an interface of the anode and the electrolyte by heating the cell at an elevated temperature of at least about 75° C. for an extended period of time longer than 7 days prior to the cell being pulse discharged at a high pulse rate, wherein the thusly heat treated cell is pulse dischargeable under current pulse applications without exhibiting voltage delay.

6. The electrochemical cell of claim 5 wherein the ionically conductive solid-electrolyte interphase is characterized by the cell having been exposed to the elevated temperature for the extended period of time of at least about 14 days.

7. The electrochemical cell of claim 6 wherein the nonaqueous electrolyte comprises a low viscosity solvent selected from the group consisting of an ester, an ether and a dialkyl carbonate, and mixtures thereof.

8. The electrochemical cell of claim 7 wherein the low viscosity solvent is selected from the group consisting of 1,2-dimethoxyethane, dimethyl carbonate, methyl acetate, tetrahydrofuran, diglyme, triglyme and tetraglyme, and mixtures thereof.

9. The electrochemical cell of claim 5 wherein the nonaqueous solvent comprises a high permittivity solvent selected from the group consisting of a cyclic carbonate, a cyclic ester and a cyclic amide, and mixtures thereof.

10. The electrochemical cell of claim 9 wherein the high permittivity solvent is selected from the group consisting of propylene carbonate, ethylene carbonate, γ-butyrolactone, N-methyl-pyrrolidinone, dimethyl sulfoxide, acetonitrile, dimethyl formamide and dimethyl acetamide, and mixtures thereof.

11. The electrochemical cell of claim 10 wherein the cathode comprises a cathode active material selected from the group consisting of silver vanadium oxide, copper vanadium oxide, copper silver vanadium oxide, manganese dioxide, cobalt oxide, nickel oxide, carbon, fluorinated carbon, titanium disulfide and copper vanadium oxide, and mixtures thereof.

12. The electrochemical cell of claim 5 wherein the alkali metal salt comprising the electrolyte solution is selected from the group consisting of $LiPF_6$, $LiAsF_6$, $LiSbF_6$, $LiBF_4$, $LiClO_4$ and $LiCF_3SO_3$, and mixtures thereof.

13. A pulse dischargeable electrochemical cell comprising a lithium anode, a silver vanadium oxide cathode and an activating electrolyte of lithium hexafluoroarsenate, propylene carbonate and dimethoxyethane, the improvement comprising: the cell characterized as having an ionically conductive solid-electrolyte interphase provided at the interface of the anode, the cathode and the electrolyte as a result of the cell having been exposed to a temperature of at least about 75° C. for at least 14 days prior to pulse discharge so that the cell is pulse dischargeable under current pulse applications at a high pulse rate without exhibiting voltage delay.

14. A method for reducing voltage delay in an electrochemical cell, which comprises:

a) providing a casing;

b) providing an anode electrode disposed inside the casing and comprising an alkali metal;

c) providing a solid cathode electrode in electrical association with the anode electrode inside the casing;

d) activating the electrochemical cell with a nonaqueous electrolyte provided in the casing and operatively associated with the anode and the cathode electrodes;

e) sealing the casing; and f) forming an ionically conductive solid-electrolyte interphase at the interface of the electrodes and the electrolyte by heating the sealed cell at an elevated temperature of at least about 75° C. for a period of time longer than 7 days prior to the cell being pulse discharged so that the cell is pulse dischargeable under current pulse applications at a high pulse rate without exhibiting voltage delay.

15. The method of claim 14 including heating the cell for at least 14 days.

16. The method of claim 14 including heating the cell at about 80° C.

17. The method of claim 14 including heating the cell at about 80° C. for at least about 14 days.

18. The method of claim 14 including providing the nonaqueous electrolyte comprising an alkali metal salt dissolved therein, wherein the alkali metal of the salt is similar to the alkali metal comprising the anode.

19. The method of claim 14 providing the nonaqueous electrolyte comprising a low viscosity solvent and selecting the low viscosity solvent from the group consisting of an ester, an ether and a dialkyl carbonate, and mixtures thereof.

20. The method of claim 14 providing the nonaqueous electrolyte comprising a high permittivity solvent and selecting the high permittivity solvent from the group consisting of a cyclic carbonate, a cyclic ester and a cyclic amide, and mixtures thereof.

21. A method for reducing voltage delay in an electrochemical cell, which comprises:

a) providing a casing;

b) providing an anode disposed inside the casing and comprising an alkali metal;

c) providing a solid cathode in electrical association with the anode inside the casing;

d) activating the electrochemical cell with a nonaqueous electrolyte provided in the casing and operatively associated with the anode and the cathode, the nonaqueous electrolyte comprising at least one ion-forming alkali metal salt selected from one of the group consisting of hexafluorophosphate, hexafluoroarsenate and hexafluoroantimonate, and mixtures thereof, wherein the alkali metal salt is similar to the alkali metal comprising the anode;

e) hermetically sealing the casing; and f) forming an ionically conductive solid-electrolyte interphase at the interface of the anode, the cathode and the electrolyte by heating the cell at an elevated temperature of at least about 75° C. for an extended period of time longer than 7 days prior to the cell being pulse discharged so that the cell is pulse dischargeable under current pulse applications at a high pulse rate without exhibiting voltage delay.

22. The method of claim 21 including heating the cell for at least about 14 days.

23. A pulse dischargeable electrochemical cell comprising anode and cathode electrodes and an operatively associated electrolyte housed inside of a casing, the improvement comprising: the cell characterized as having an ionically conductive solid-electrolyte interphase provided at the interface of the electrodes and the electrolyte as a result of the cell having been exposed to an elevated temperature of at least about 75° C. for at least about 14 days prior to pulse discharge of the cell so that the cell is pulse dischargeable under current pulse applications at a high pulse rate without exhibiting voltage delay.

24. An electrochemical cell dischargeable under current pulse applications, which comprises:

a) a casing;

b) an anode disposed inside the casing and comprising an alkali metal which is electrochemically oxidized to form metal ions upon discharge to generate electron flow in an external electrical circuit connected thereto;

c) a cathode in electrical association with the anode inside the casing, the cathode comprising a cathode active material, wherein the electron flow is generated by intercalation of the metal ions formed by oxidation of the alkali metal anode into the cathode active material;

d) a nonaqueous electrolyte provided in the casing to activate the anode and the cathode; and e) an ionically conductive solid-electrolyte interphase provided at an interface of the anode and the electrolyte by heating the cell at an elevated temperature of at least about 75° C. for at least about 14 days prior to pulse discharge of the cell so that the cell is pulse dischargeable under current pulse applications at a high pulse rate without exhibiting voltage delay.

* * * * *